(12) United States Patent
Turner et al.

(10) Patent No.: US 8,500,591 B2
(45) Date of Patent: Aug. 6, 2013

(54) FINAL DRIVE ARRANGEMENT

(75) Inventors: Jeffrey S. Turner, Coffeyville, KS (US); Mark J Besler, Asbury, IA (US)

(73) Assignee: Deere & Company, Moline, IL (US)

( * ) Notice: Subject to any disclaimer, the term of this patent is extended or adjusted under 35 U.S.C. 154(b) by 294 days.

(21) Appl. No.: 13/016,282

(22) Filed: Jan. 28, 2011

(65) Prior Publication Data
US 2012/0196715 A1 Aug. 2, 2012

(51) Int. Cl.
*F16H 57/04* (2010.01)
*F16H 37/06* (2006.01)
*F16D 13/00* (2006.01)
*B60K 17/00* (2006.01)

(52) U.S. Cl.
USPC ........... 475/159; 475/160; 475/286; 475/330; 188/71.5; 188/170; 180/343; 192/113.36

(58) Field of Classification Search
USPC .................................................. 475/159, 160
See application file for complete search history.

(56) References Cited

U.S. PATENT DOCUMENTS

| | | | |
|---|---|---|---|
| 2,953,040 A | | 9/1960 | Christenson et al. |
| 3,439,766 A | * | 4/1969 | Frost et al. .................... 180/308 |
| 3,502,166 A | | 3/1970 | Christenson et al. |
| 4,140,198 A | | 2/1979 | Chamberlain |
| 4,142,615 A | | 3/1979 | Sidles, Jr. et al. |
| 4,191,073 A | | 3/1980 | Ritter, Jr. |
| 4,317,498 A | | 3/1982 | Jirousek et al. |
| 4,540,073 A | * | 9/1985 | Rogier ........................ 192/221.1 |
| 4,610,331 A | | 9/1986 | Rogier et al. |
| 5,701,976 A | * | 12/1997 | Kumagai et al. ............. 188/71.5 |
| 6,491,600 B1 | | 12/2002 | Smemo et al. |
| 2010/0263969 A1 | | 10/2010 | Bayer et al. |

OTHER PUBLICATIONS

Extended European Search Report in Counterpart European Application No. 12151984 (May 7, 2012) (5 pages).

* cited by examiner

*Primary Examiner* — David D Le
*Assistant Examiner* — Colby M Hansen (57) ABSTRACT

A vehicle final drive includes a fixed spindle about which a wheel hub is mounted for rotation by wheel bearings, and within which a park and service brake assembly is mounted including a stack of Belleville springs carried by an input quill mounted within an inner end region, and a disc brake pack mounted within an outer end region. Located in the hub outboard of the spindle is a two-stage planetary reduction transmission. A reaction plate is fixed to an outer end face of the spindle cylindrical portion and holds the disc brake pack and a hub of a double ring gear of the transmission in place and preloads the wheel bearings. A fluid distribution manifold is defined by a passage in the spindle for distributing flow for cooling and/or lubricating an input thrust bearing, input drive shaft coupling splines, the brake disc pack, the wheel bearings, and the first stage planet gear bearings.

9 Claims, 11 Drawing Sheets

FINAL DRIVE ARRANGEMENT

FIELD OF THE INVENTION

The present invention relates to vehicle final drive arrangements, and, more particularly, relates to final drive arrangements including a planetary reduction section and oil cooled brake discs used both in park brake and service brake operations.

BACKGROUND OF THE INVENTION

Off-road vehicles such as articulated four wheel drive loaders, for example, are often equipped with final drives that employ a planetary transmission for speed reduction and an oil cooled brake pack to which both park brake and service brake forces are selectively applied to respectively establish park brake and service brake engage conditions. Often these final drives are not arranged so as to be easily serviced or assembled or so as to have a relatively simple passage arrangement for routing cooling and/or lubricating fluid to the brake discs and bearings subject to relatively high input speeds, i.e., speeds that occur upstream of the second stage of the planetary transmission.

U.S. Pat. No. 4,142,615 discloses a vehicle final drive arrangement including a spindle rotatably supporting a wheel hub and having a disc brake pack mounted within an outer end region thereof with a reaction plate being mounted at the outer end of the spindle. Cooling and lubrication fluid is contained within a chamber formed by the wheel hub, a planet carrier fixed to an outer end of the hub and a cap fixed to the planet carrier, this fluid having to exist at a certain level within the chamber in order for there to be sufficient fluid available for the planet carrier and gears to enter the fluid and splash or slop cooling and lubricating fluid around the moving parts of the planetary reduction gear train. Cooling and lubricating fluid existing at the center of the gear train is pumped by the meshing teeth of the sun gear and planet gears so that it flows through a passage extending between the teeth and the inner part of the disc brake pack so that adequate fluid is available for cooling the disc brake pack.

SUMMARY OF THE INVENTION

According to the present invention, there is provided a final drive including a fixed spindle on which is mounted a wheel hub containing a two-stage, planetary transmission, and embodying a disc brake pack held in place by a novel reaction plate fixed to an outer axially facing surface of the spindle.

An object of the invention is to provide a final drive, as set forth above, with a reaction plate serving at least one of, as a retaining member fixing a ring gear hub of the planetary transmission to the spindle, as a retaining member for a fluid nozzle for directing lubrication and cooling fluid to the disc brake pack and to bearings supporting first stage planetary gears of the planetary transmission, for supporting a plurality of separating springs acting on an adjacent stator disc of the disc brake pack for separating this stator disc from the reaction plate, with this separation opening a path for fluid to flow into a zone containing ring gear teeth and first stage planetary gears meshed with these teeth.

This object of the invention is achieved by providing a reaction plate which extends radially outward of the disc brake pack, with axially inwardly facing, annular surface of the reaction plate bearing against an axially outwardly facing, annular surface of the ring gear hub, the latter having a splined connection with the spindle and serving to mount the inner race of an outer wheel bearing. The reaction plate further provides a stepped bore located in axial alignment with a cooling and lubrication fluid supply passage provided in the spindle, and located at a radius from a central axis of the spindle which is equal to the radius at which the planet gears of the first stage planet carrier are mounted for rotation, with the stepped bore serving to support opposite ends of a tubular fluid dispensing nozzle spanning a location adjacent to, and having fluid axially spaced openings located for dispensing fluid radially onto the disc brake pack, and an end opening for dispensing fluid axially through the stepped bore for lubricating the bearings supporting the first stage planet gears.

DESCRIPTION OF THE PREFERRED EMBODIMENT

Figure 1:
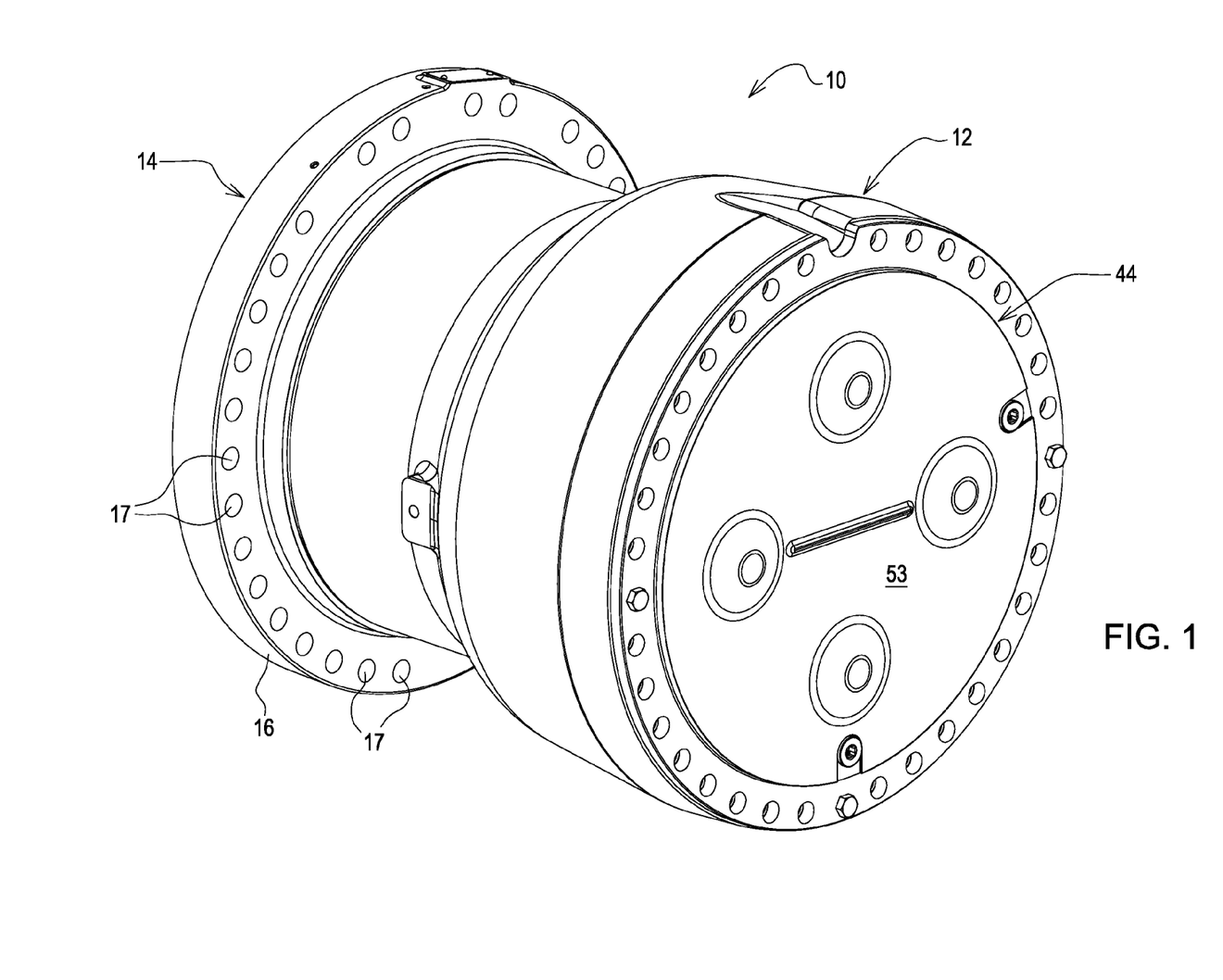
FIG. 1 is a perspective view of a final drive arrangement constructed in accordance to the principles of the present invention.
Figure 2:
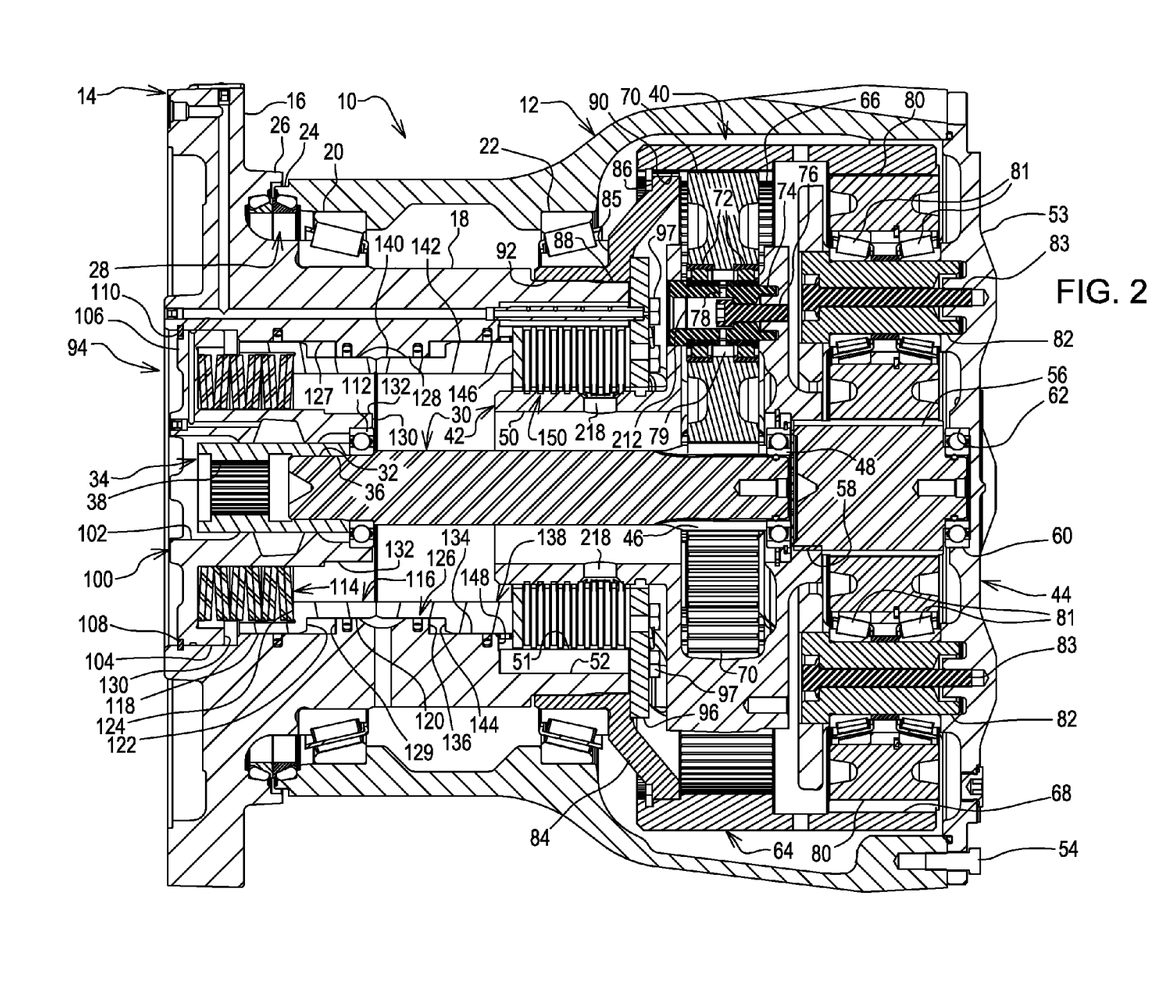
FIG. 2 is vertical sectional view taken through the longitudinal center of the final drive arrangement shown in FIG. 1.

Referring now to FIGS. 1 and 2, there is shown a final drive arrangement 10, which is particularly adapted for use with a 4WD, articulated loader (not shown). The final drive arrangement 10 includes a generally bell-shaped wheel hub 12 and a spindle 14, the spindle 14 including an annular mounting flange 16 containing a plurality of mounting holes 17 and being joined to, and projecting radially from, an inner end of a generally cylindrical section 18 extending axially within the smaller end of the bell-shaped hub 12. The mounting holes 17 are arranged in a circular pattern and provided for receiving mounting bolts (not shown) for securing the spindle 14 to a housing (not shown) carried by a vehicle chassis. The wheel hub 12 is supported for rotating about the cylindrical section 18 of the spindle 14 by axially inner and outer tapered wheel bearings 20 and 22, respectively, with the inner end of the wheel hub 12 being radially outboard of the inner wheel bearing 20 and being defined by an axially inwardly projecting, stepped annular flange 24 having an outer step disposed just outwardly of an annular, axially outward projecting flange 26 of the spindle mounting flange 16. Located within a cavity defined by the annular flanges 24 and 26 is a metal face seal assembly 28 including first and second opposed metal rings respectively located within the annular flanges 24 and 26, with first and second respectively being compressed between the flanges 24 and 26 and the first and second metal rings.

Located centrally within the wheel hub 12 is a drive shaft 30 having a splined inner end section 32. A sleeve-like input drive coupler 34 has a splined outer interior end section 36 received on the outer end section 32 of the drive shaft 30 and has a splined inner interior end section 38 adapted for receiving a splined exterior end section of a drive input shaft (not shown).

Drive torque is transferred from the drive shaft 30 to the wheel hub 12 by a gear reduction comprising a two-stage planetary transmission 40 including first and second stage planet carriers 42 and 44, respectively. The first stage planet carrier 42 is disposed in surrounding relationship to a first stage sun gear 46 formed on an outer end region of the drive shaft 30, with an inner race of a ball bearing 48 being carried the outer end region of the shaft 30 just outward of the sun gear 46, and with an outer race of the ball bearing 48 being fixed to the carrier 42.

The first stage carrier 42 includes a cylindrical, axially extending, inner end section 50 projecting inside the spindle section 18 in concentric spaced relationship to the drive shaft 30 and to an inner cylindrical surface 51 of the spindle section 18, the cylindrical surface 51 being provided with twelve equally spaced, longitudinally extending, near semi-cylindrical recesses 52 (see FIG. 6) for purposes described below. The second stage carrier 44 includes an axially outer side defining a fluid impervious end plate 53 secured tightly against an annular mounting face at an outer end of the wheel hub 12 by a plurality of mounting bolts 54 (only one shown) arranged in a circular pattern. A second stage sun gear 56 is disposed in axial alignment with the drive shaft 30 and is fixed for rotation with the first stage planet carrier 42 by a splined connection 58 of an inner end region of the sun gear 56 with the outer side of the first stage carrier 42. An outer end region of the second stage sun gear 56 is mounted for rotation in the end plate 53 by a ball bearing 60 having an inner race fixed on a shoulder of the sun gear 56 and an outer race fixed in a circular recess 62 formed at a central location in the end plate 53. Surrounding the first and second stage carriers 42 and 44, respectively, is a double ring gear 64 including an annular first set of teeth 66 disposed radially outward of the first stage sun gear 46, and an annular second set of teeth 68 disposed radially outward of the second stage sun gear 56. A set of first stage planet gears 70 (only one shown) each have teeth meshed with the sun gear 46 and with the teeth 66. The planet gears 70 are each rotatably mounted to the first stage planet carrier 42 by a pair of roller bearings 72 having outer races respectively pressed in outer ends of the planet gear 70 and inner ends respectively pressed onto a tubular cylindrical mounting pin 74 having an inner end defining a head pressed into an inner side of the carrier 42 and having an outer end received in an annular recess provided in an outer side of the carrier 42, the pin 74 being held in place by a bolt 76 screwed into a threaded bore provided in the outer side of the carrier 42 and having a head engaged with a shoulder provided on the interior of the mounting pin 74 at a location approximately halfway between opposite ends of the pin 74. It can be seen then that the interior of the pin 74 inward of the bolt 76 defines a passage for cooling oil to flow to a set of radial ports 78 provided in the tubular pin 76 in a zone leading to an annular space 79 between the gear support bearings 72, thereby lubricating the bearings 72.

A set of second stage planet gears 80 (only two shown) each have teeth meshed with the sun gear 56 and with the ring gear teeth 68. The planet gears 80 are each rotatably mounted to the second stage planet carrier 44 by a pair of tapered roller bearings 81 having outer races respectively pressed in outer ends of the planet gear 80 and inner ends respectively pressed onto a cylindrical surface of a mounting pin 82 having an inner end defining a head pressed into an inner side of the carrier 44 and having an outer end received in an annular recess provided in the end plate 53. Each pin 82 is held in place by a bolt 83 screwed into a threaded bore provided in the end plate 53 and having a head engaged with a shoulder defined by a circular recess provided at the inner end of the pin 82.

The double ring gear 64 includes an annular hub 84 having radially extending inner and outer portions 85 and 86, respectively, joined together by an inclined middle portion. The inner radial portion 85 of the hub 84 is provided with interior splines received on a splined exterior outer end region 88 of the spindle section 18, and with the radial outer portion 86 being provided with exterior splines engaged with a splined inner end surface region 90 adjacent the first set of teeth 66 of the ring gear 64. The ring gear hub 84 includes a cylindrical bearing mounting portion 92 joined to and projecting axially inwardly from the hub inner portion 85 and being received on a cylindrical outer surface located adjacent to, and having a diameter approximately equal to that of the splined outer end region 88 of the cylindrical spindle section 18. The axially outer wheel bearing 22 has an inner race received in a right angle bearing seat defined by the cylindrical mounting portion 92 and the radial inner hub portion 85. An outer race of the wheel bearing 22 is received in a right angle bearing seat formed inside an outer end portion of the small part of the bell of the wheel hub 12.

Figure 3:
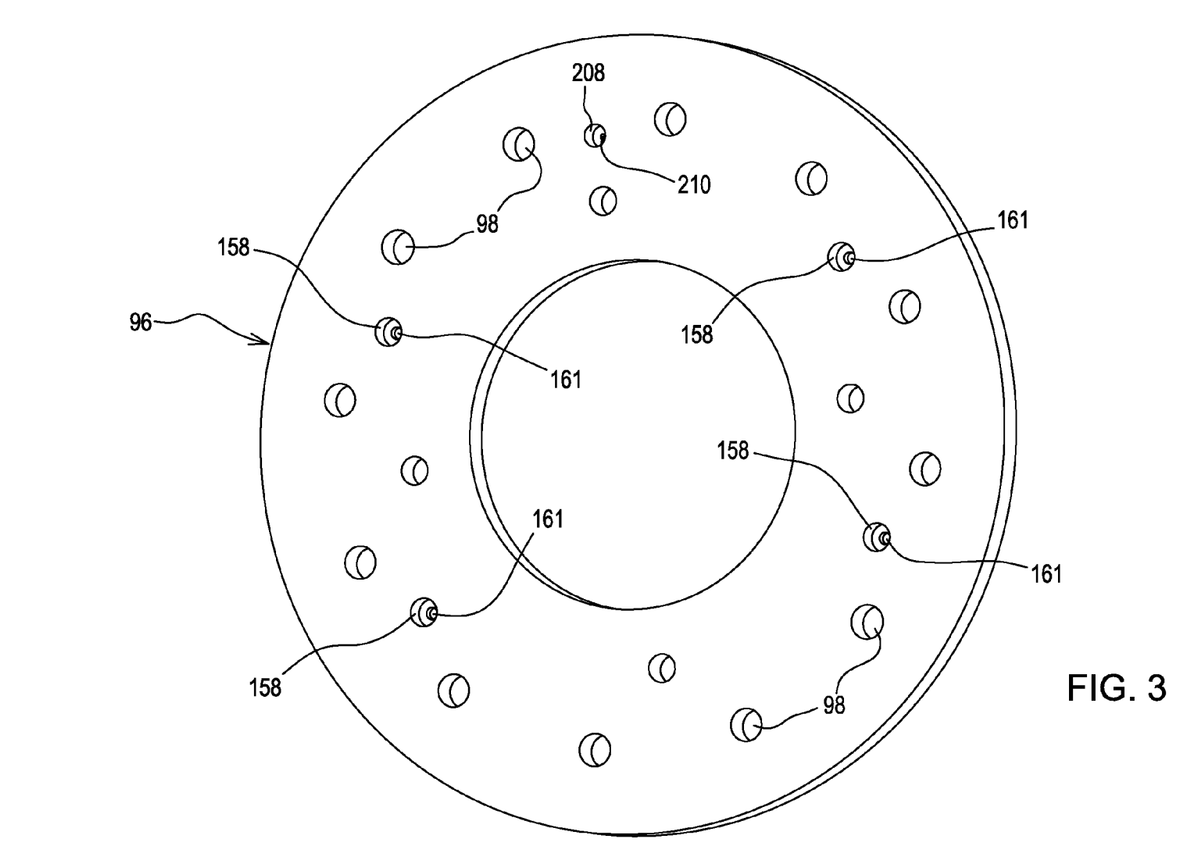
FIG. 3 is a perspective view of the reaction plate shown in FIG. 2.
Figure 4:
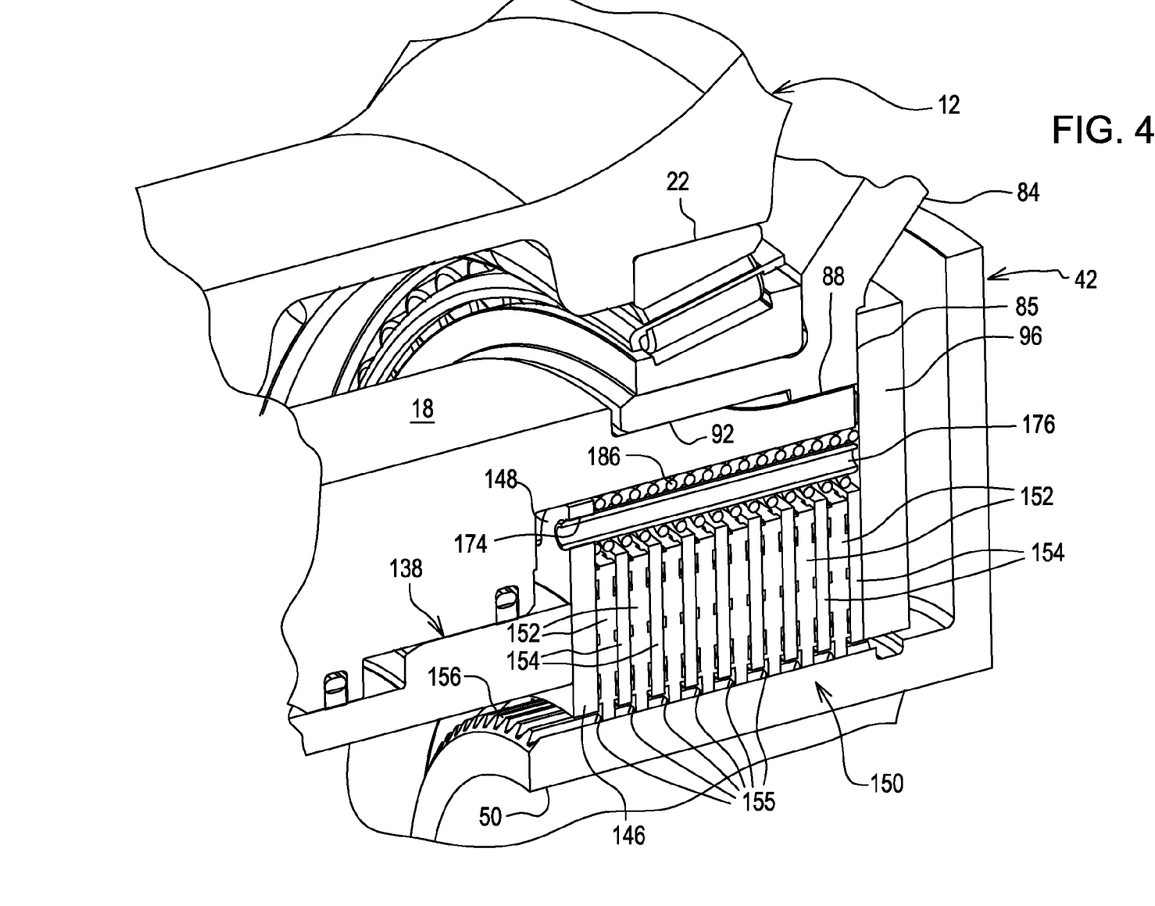
FIG. 4 is a perspective, partial sectional view of a portion of the disc brake pack of the final drive arrangement and showing one of the springs for resisting movement of the pressure plate toward the reaction plate.

Referring now also to FIGS. 3 and 4, it can be seen that mounted interiorly of the cylindrical section 18 of the spindle 14 is a combined service and park brake arrangement 94 including an annular brake reaction plate 96 secured to an axially outward facing end surface of the spindle section 18 by a plurality of mounting bolts 97 respectively projecting through a circular pattern of holes 98 provided in the plate 96 and being screwed into respective axially aligned threaded bores 99 (see FIG. 6) provided in the outer end of the spindle section 18. The bolts 97 thus act to clamp an annular, radially outer region of the reaction plate 96 in tight engagement with an axially outward facing surface of the ring gear hub 84, this surface having a portion which is opposite to that engaged by the inner race of the outer wheel bearing 22. Thus, by using appropriate shims (not shown) located between the reaction plate 96 and the axially outer end of the spindle section 18 and the ring gear hub 84, the wheel bearings 20 and 22 can be preloaded a desired amount.

The combined service and park brake assembly 94 further includes an input quill 100 including a cylindrical hub portion 102, a cylindrical mounting portion 104 located radially outward of, and disposed concentric to, the hub portion 102 and a radial end portion 106 joining inner ends of the hub portion 102 and the mounting portion 104. The mounting portion 104 is tightly received in an annular recess provided interiorly of an inner end region of the spindle 14 and is held in place by a snap ring 108 located in an annular snap ring groove provided in the spindle 14 and received an annular ring seat 110 provided on the inner end of the quill mounting portion 104. A thrust bearing 112, in the form of a ball bearing, has an outer race pressed into an outer interior location of the quill hub 102, and has an inner race pressed onto the drive shaft 30 at a location just outward of the splined inner end 32 coupling the input drive coupler 34 to the shaft 30. Thus, the quill 100 rotatably supports the drive shaft 30. The hub portion 102, mounting portion 104 and end portion 106 cooperate to define an annular, outwardly-opening receptacle in which is received an inner end of a stack of Belleville springs 114 which act, as described below, to apply the park brake when fluid pressure for disengaging the park brake and for applying the service brake is removed.

Provided for selectively compressing the stack of Belleville springs 114 so as to release the park brake is a stepped cylindrical park brake piston 116 including radially outer and inner sections 118 and 120, respectively, joined together so as to define an axially, outward facing, annular shoulder 122 and an axially inward facing annular shoulder 124 engaging an outward end of the stack of Belleville springs 114. The cylindrical spindle section 18 is provided with a stepped piston bore 126 located just axially outward of the end section containing the mounting portion 104 of the quill 100, the stepped piston bore 126 including a first outer bore section 127 slidably receiving the outer park brake piston section 118, and being joined to a central inner bore section 128 slidably receiving the inner brake piston section 120, with an axially inward facing annular shoulder 129 extending between the bore sections 127 and 128. It is noted that the mounting portion 104 of the quill 100 has an annular axially outward facing end defining a stop surface 130 which is in the path of movement of the outer park brake piston section 118 and serves to prevent the park piston 116 from compressing the stack of Belleville springs 114 to the extent that they become flattened to a solid height.

The stack of Belleville springs 114 can be compressed for the purpose of releasing the park brake for service by operation of a service tool (not shown) having a threaded bore which may be received on an outer threaded end region 132 of the quill hub 102, the tool having a shoulder disposed for engaging and compressing the springs 114 as the tool is screwed inwardly along the threaded end region 132.

Thus, it will be appreciated that the location of the input quill 100 at the inner end of the spindle 14 makes it easy to assemble the input quill 100 together with the thrust bearing 112, stack of Belleville springs 114 and park brake piston 116.

The stepped piston bore 126 further includes a second outer bore section 134 joined to an outward end of the central inner bore section 130 by an axially outward facing annular shoulder 136. A stepped cylindrical service brake piston 138 has a radially inner section 140 slidably received in the inner bore section 128 and disposed in abutting relationship to the inner section 120 of the park brake piston 116.

Figure 5:
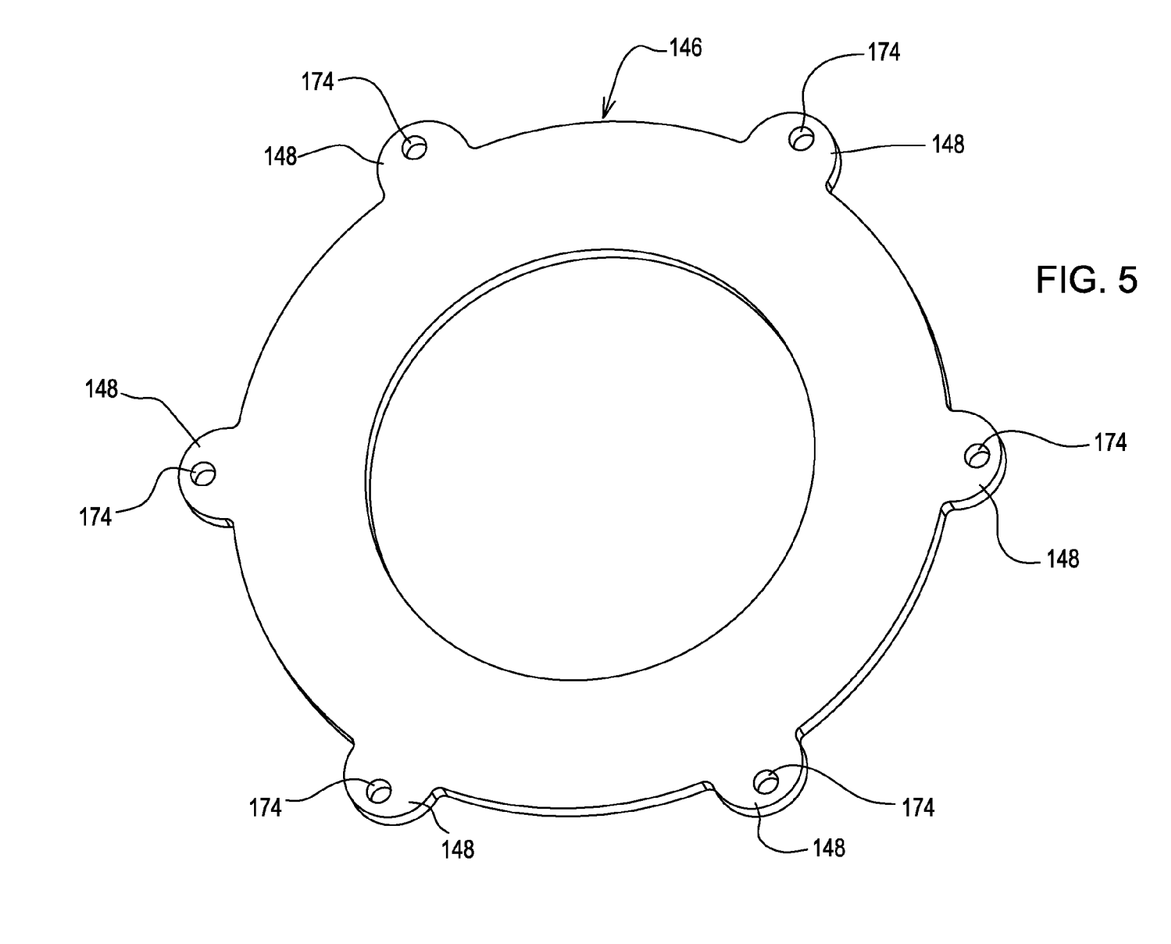
FIG. 5 is a perspective view of the pressure plate shown in FIG. 4.
Figure 6:
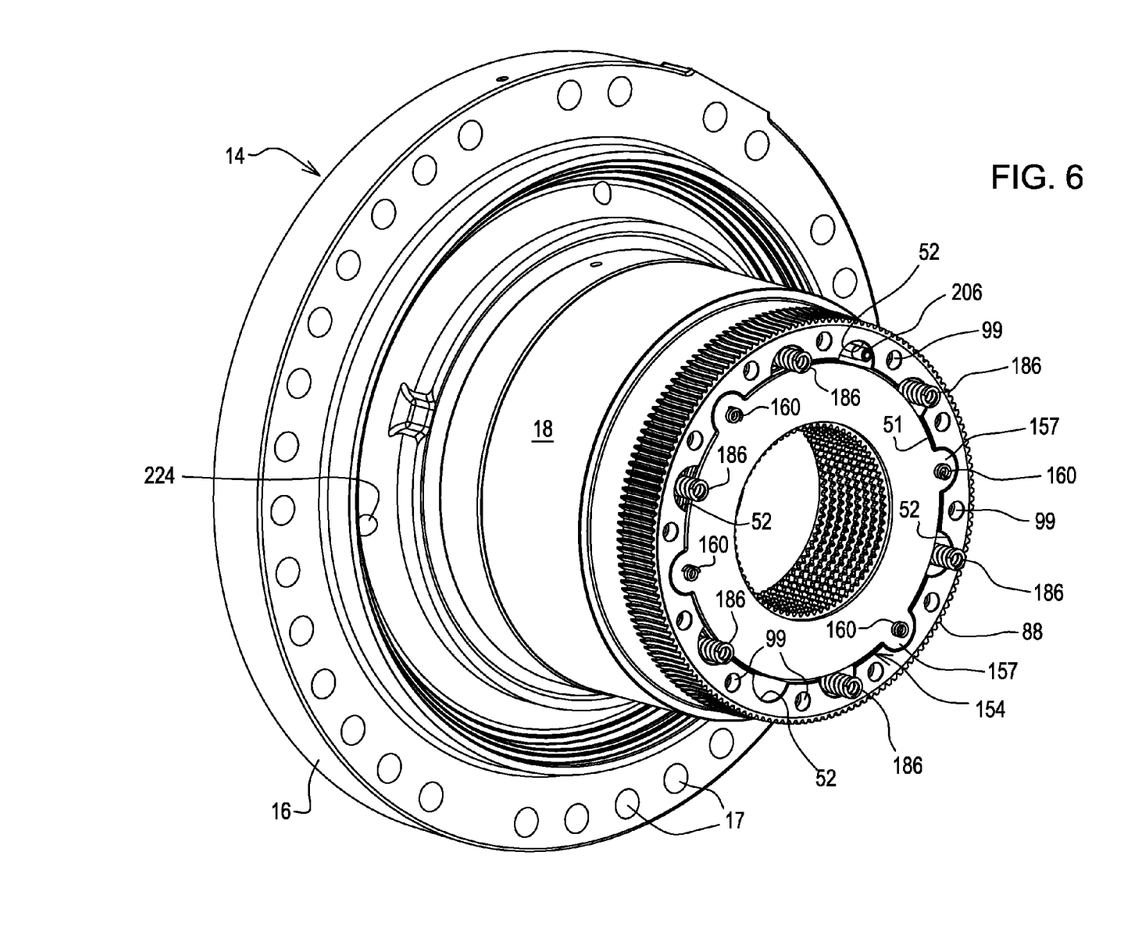
FIG. 6 is a perspective view of the spindle showing the mounting face for receiving the reaction plate and showing the disc brake pack and associated components.
Figure 11:
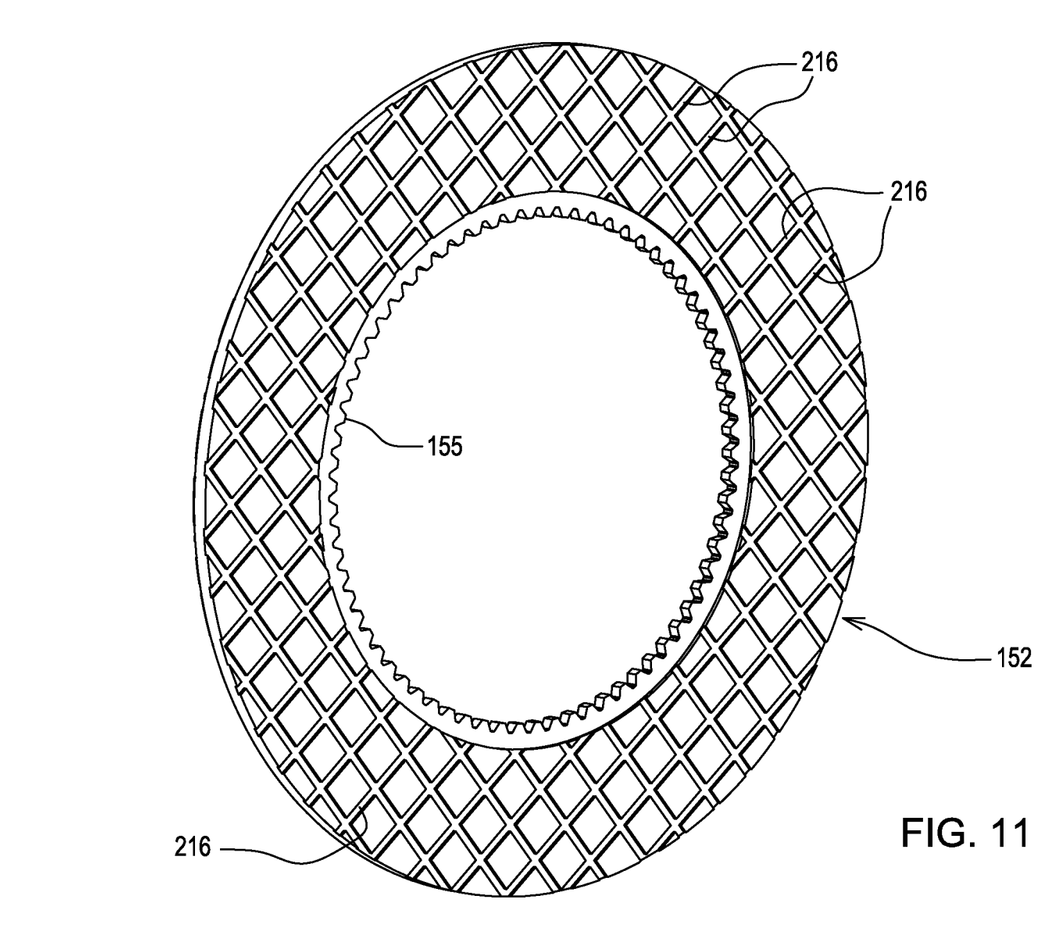
FIG. 11 is a perspective view showing one of the rotor discs of the disc brake pack showing the grooves in the braking material on one side of the rotor disc.

Referring now also to FIGS. 4, 5 and 6, it can be seen that an axially outer section 142 of the piston 138 is joined to the inner section 140 so as to define an axially inward facing annular shoulder 144, the outer piston section 142 being slidably received in the second outer bore section 134 and having an outer annular end disposed in engagement with an annular pressure plate 146. As can be seen in FIG. 5, the pressure plate 146 has six substantially semi-cylindrical ears 148 formed at equally spaced locations about an outer peripheral edge thereof and received for axial movement along every other one of the plurality of near semi-cylindrical recesses 52 provided in the annular interior surface 51 of the spindle 18. Located on the opposite side of the pressure plate 146 from the service brake piston 138 is a disc brake pack 150, including a plurality of annular rotor discs 152 (see FIG. 11) interleaved with a plurality of annular stator discs 154 (see FIG. 6), with each rotor disc 152 having an interior edge defined by a plurality of tangs 155 respectively received for sliding axially along a plurality of splines 156 provided along the circumference of the cylindrical section 50 of the first stage carrier 42. As can best be seen in FIG. 6, each stator disc 154 has an outer circumference provided with four near semi-cylindrical ears 157, with adjacent first and second pairs of the ears 157, respectively, at opposite sides of the disc 154 being respectively received for axial movement along first and second pairs of the recesses 52 located at opposite sides of diametrically opposite ones of the recesses 52 which are occupied by diametrically opposite ones of the ears 148 of the pressure plate 146.

Referring to FIG. 3, it can be seen that the reaction plate 96 is provided with four stepped bores respectively disposed in axial alignment with, and having larger end sections defining spring receptacles opening inwardly toward the four ears 157 of the adjacent stator disc 154 and respectively receiving four coil compression springs 160. Each of the springs 160 has a length which is completely received in the receptacle 158 when a braking force is applied to the disc brake stack 150 causing the adjacent stator disc 154 to move flat against the reaction plate 96. The smaller end of each of the stepped bores defines a fluid passage 161 having a function described below.

Figure 7:
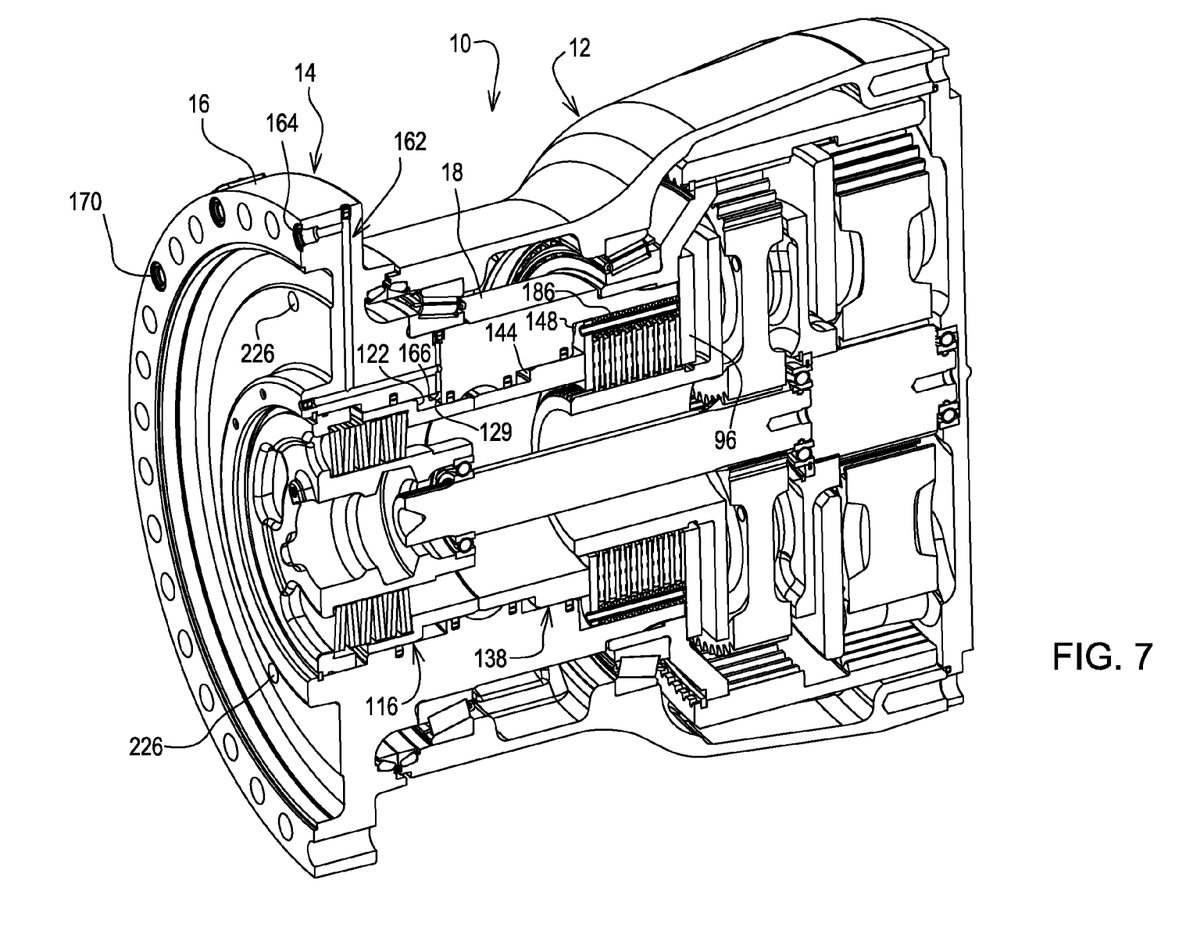
FIG. 7 is a perspective longitudinal sectional view of the portion of the final drive arrangement containing the service and park brake arrangement, with the section being taken so as to show the park brake pressure fluid supply passage.
Figure 8:
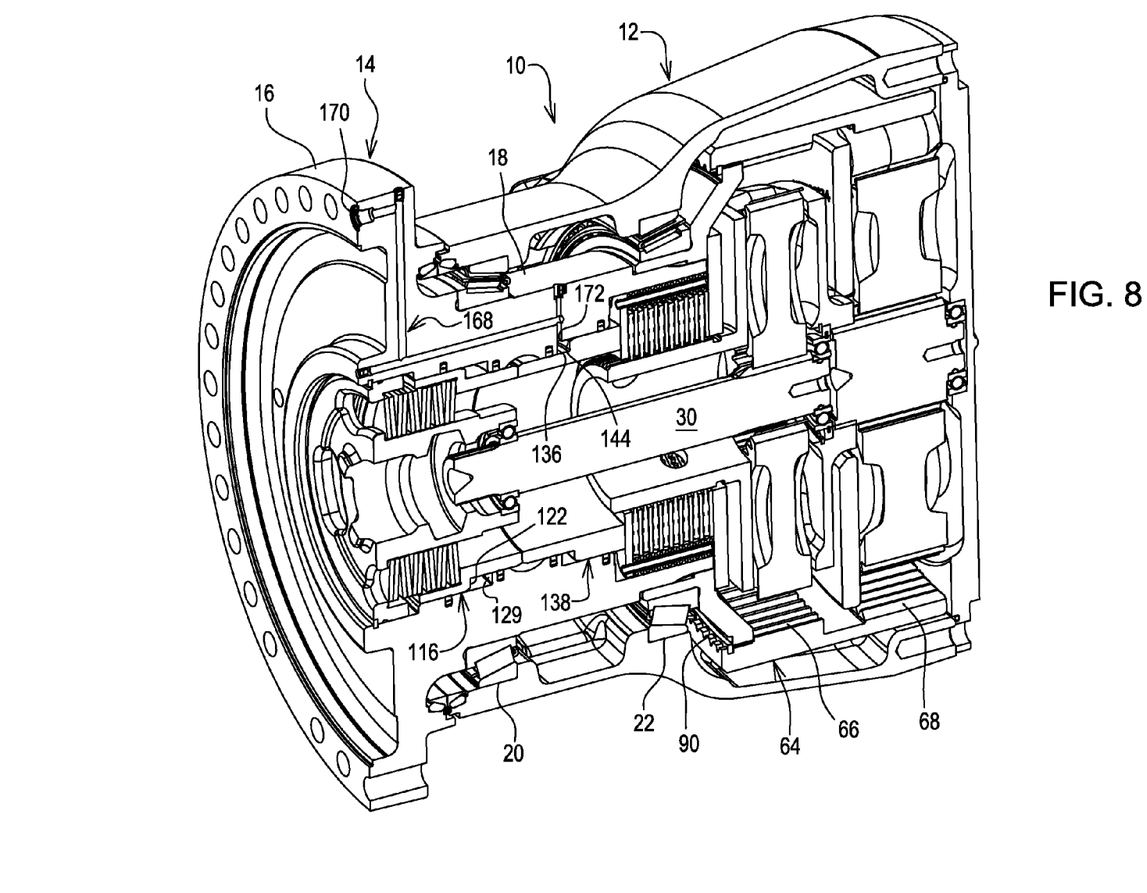
FIG. 8 is a perspective view somewhat like that of FIG. 7, but with the section being taken so as to show the service brake pressure fluid supply passage.

Referring now also to FIG. 7, it can be seen that a park brake pressure supply passage 162 is provided in the spindle 14 and includes an inlet 164 at an inner surface of the flange 16, the passage 162 extending radially inwardly in the flange from the inlet 164, and then axially in the cylindrical section 18 to an outlet 166 located between the park brake piston shoulder 122 and the shoulder 129 of the stepped piston bore 126. Similarly, as can be seen in FIG. 8, a service brake pressure supply passage 168 is provided in the spindle 14 and includes an inlet 170 at an inner surface of the flange 16, the passage 168 extending radially inward in the flange 16 from the inlet 170, and then axially in the cylindrical section 18 to an outlet 172 located between the piston bore shoulder 136 and the service brake piston shoulder 144.

Figure 9:
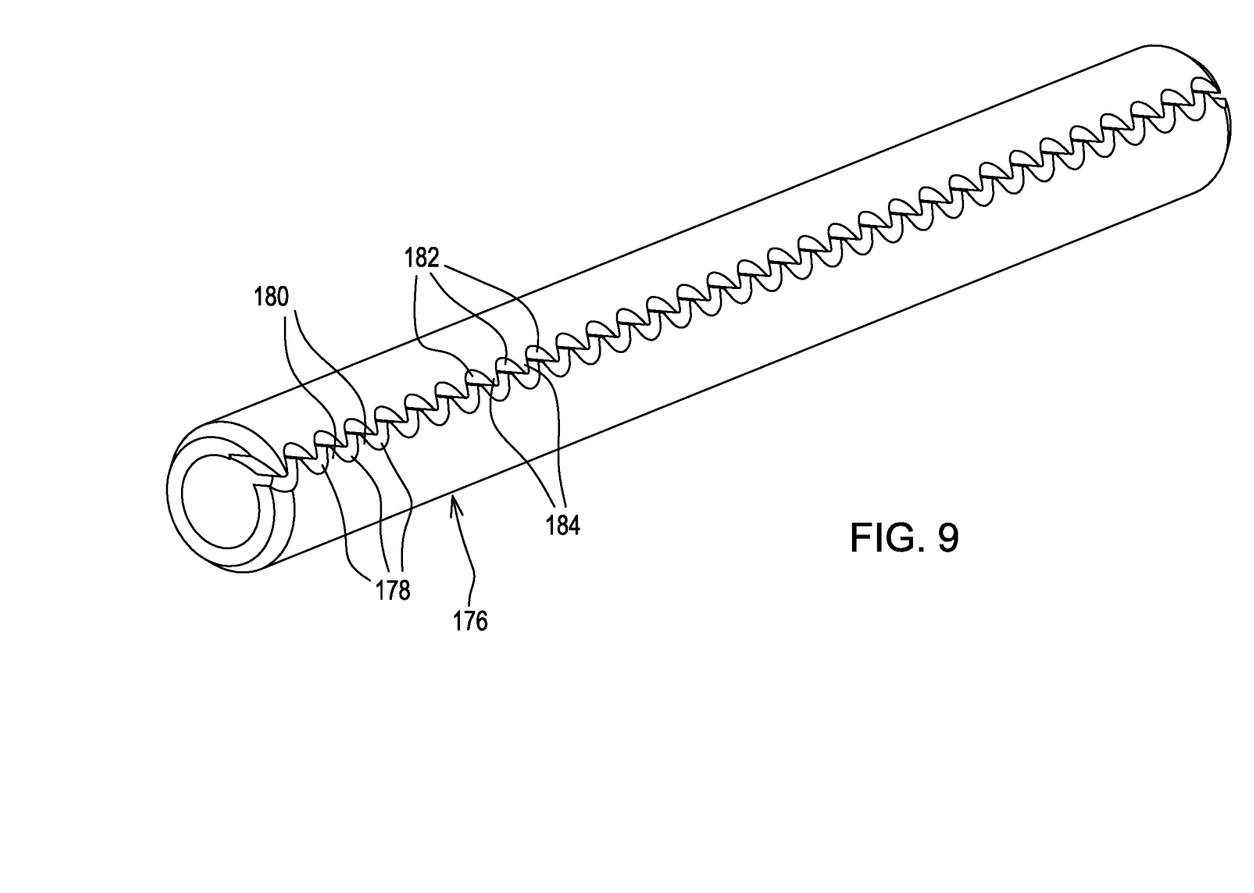
FIG. 9 is a perspective view of one of the roll pins used for supporting the springs for separating the pressure plate from the disc brake pack.

Referring back to FIGS. 4, 5 and 6, and also to FIG. 9, it can be seen that each of the ears 148 of the pressure plate 146 is provided with a bore 174 in which an inner end of a spring guide 176, formed as a tubular roll or spring pin, is inserted, with an outer end of the guide 176 bearing against an inner face of the reaction plate 96. The fit of the each guide 176 within the associated bore 174 bore is such as to permit the pressure plate 146 to slide along the spring guides 176. As depicted in FIG. 9 and having a purpose explained below, one of confronting, longitudinally extending ends of the roll pin forming the guide 176 is defined by a plurality of axially spaced semi-cylindrical cut outs 178 separated by ribs 180, while the other of the ends is defined by a plurality of axially spaced cutouts 182 separated by ribs 184. The cutouts 178 of the one end are axially offset relative to the cutouts 182 of the other end so that the ribs 184 are positioned centrally relative to the cutouts 178, and the ribs 180 are located centrally relative to the cutouts 182. Received about each of the spring guides 176 is a coil compression spring 186 that is compressed between the pressure plate 146 and the reaction plate 96 so as to establish a preload in the spring 186 resisting movement of the pressure plate 146 toward the reaction plate 96, and, hence, resisting compression of the brake disc pack 150.

As thus far described, the combined service and park brake arrangement 94 operates as follows. The stack of Belleville springs 114, are normally compressed to exert a preload for overcoming the preload in the compression springs 186 and for acting serially through the park brake piston 116, service brake piston 138 and pressure plate 146 so as to compress the disc brake stack 150 to thereby establish a park brake engaged or "on" condition. When it is desired to drive the vehicle equipped with the final drive 10, the park brake must be released and this is done by actuating a park brake controller (not shown) so as to route pressure fluid to the park brake pressure supply passage 162 (FIG. 7) so as to pressurize fluid contained in the annular space located between the annular shoulder 122 of the park brake piston 116 and the annular shoulder 129 of central the bore section 128, this fluid pressure acting against the piston shoulder 122 causing the piston 116 to shift inwardly so as to further compress the stack of Belleville springs 114 and, thereby, release the preload force compressing the disc brake stack 150. When the park brake piston 116 shifts inwardly, the force applied to the pressure plate 146 will be removed and the compression springs 186 will extend so as to move the pressure plate 146 inwardly permitting the rotor discs 152 and the stator discs 154 of the disc brake stack 150 to separate from each other, noting that the load on the compression springs 160 will then be released allowing the springs 160 to move the adjacent stator disc 154 inwardly away from the reaction plate 96. The service brake may then be selectively engaged by actuating a service brake controller (not shown) for routing service brake pressure fluid to the service brake pressure supply passage 168 (FIG. 8) so as to pressurize fluid contained in the annular space located between the annular shoulder 136 of the central bore section 128 and the service brake piston shoulder 144, this pressure fluid causing the service brake piston 138 to shift outwardly so as to act through the pressure plate 146 and overcome the resistance offered by the compression springs 186 while shifting the rotor discs 152 and stator discs 154 into braking engagement with each other so as to effect a service brake engage or "on" condition. Upon the service brake actuator being operated to relieve the pressurized fluid acting on the service brake piston 138, the loaded compression springs 186 will once again shift the pressure plate inwardly, thereby permitting the rotor discs 152 and stator discs 154 to separate from each other and for torque to thereby be delivered from the drive shaft 30 the hub 12 by way of the two stage speed reduction afforded by the planetary transmission 40.

The final drive arrangement 10 is designed so that two-stage planetary transmission 40 and disc brake pack 150 may be serviced without removing the drive arrangement from the vehicle. Specifically, in order to service the final drive arrangement 10, the following steps are performed:

1) The vehicle frame region (not shown) carrying the final drive arrangement is elevated and tire and rim (not shown) associated with the arrangement is removed;
2) the second stage carrier 44 is then removed by unscrewing the bolts 54 connecting the end plate 52 from the outer end of the hub 12 and then pulling outwardly on the carrier 44 so as to disengage the second stage sun gear 56 from the splines 58 of the first stage carrier 42 and to disengage the teeth of the planet gears 80 from the teeth 68 of the double ring gear 64;
3) the first stage carrier 42 is then removed by exerting an outward pulling force on the carrier so as to disengage the teeth of the first stage planet gears 70 from the set of ring gear teeth 66 and from the teeth of the first stage sun gear 46;
4) the drive shaft 30 is then removed;
5) the stack of Belleville springs 114 is then compressed for releasing the park brake by screwing a cylindrical collar of a spring compressing tool (not shown) onto the threaded end 132 of the quill 100, with a leading surface of the collar engaging the outer end of the stack 114 and compressing it until the stack of springs is compressed, thus removing the preload from the disc brake stack 150;
6) the reaction plate 96 is then removed by unscrewing the bolts 97 from the outer end of the spindle section 18;
7) the brake pack 150 is then removed;
8) If necessary, the service brake piston 138 is removed; and
9) If necessary, the brake seals located in annular seal grooves provided in the stepped bore sections 128 and 134 for engaging the outer surface of the brake piston 138 are removed.

Figure 10:
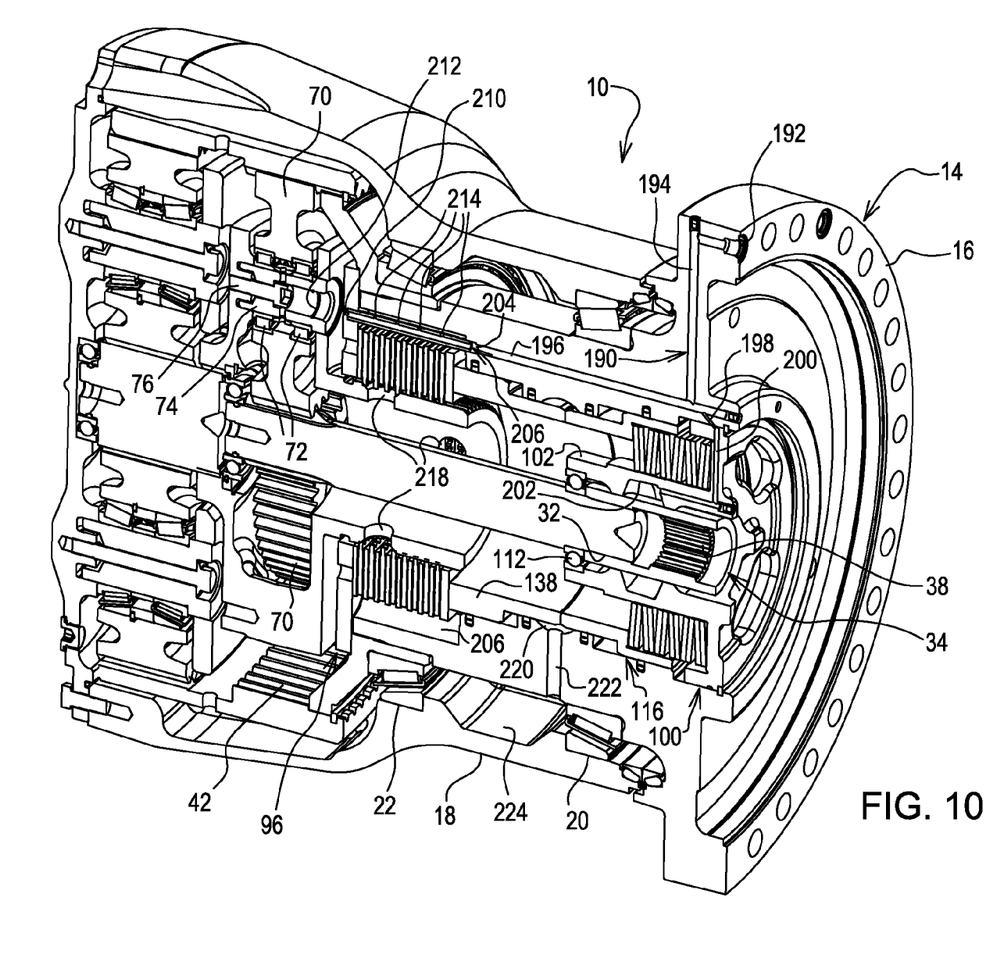
FIG. 10 is a perspective of a vertical sectional view taken through the spindle so as to show the cooling and lubrication fluid supply passage including a passage section serving as a manifold for distributing cooling and lubrication fluid to various components of the final drive.

The final drive arrangement 10 is designed for having a high speed input (6500 rpm), which would result in there being significant windage loses if the hub 12 were to contain oil to a level required for cooling the components operating at that speed. In order to avoid these significant windage loses, it is necessary that cooling and lubrication oil be supplied under pressure for those components subject to the high speed, namely the input thrust bearing 112, the disc brake pack 150 and the first stage planetary carrier roller bearings 72. To this end, as can best be seen in FIG. 10, the final drive arrangement 10 includes a pressurized cooling and lubrication fluid input passage 190 including an inlet 192 located at an inner surface of a radially outer location of the spindle flange 16, the inlet being coupled to a radial passage section 194 which is joined to a manifold passage section 196 extending axially in the cylindrical section 18 of the spindle 14. The manifold passage section 196 is first coupled to a small branch passage 198 located in an inner end of the spindle 14 and in fluid communication with an inlet of a fluid feed passage 200 provided in the input quill 100 and extending first radially through the mounting portion 104 and end portion 106, and then axially in the hub 102 to an annular recess 202 provided intermediate opposite ends of the quill 100 for the purpose of carrying cooling and lubrication oil about the input drive coupler 34 so as to provide cooling and lubrication for the thrust bearing 112 and the coupling splines 32 and 36 respectively of the drive shaft 30 and coupler 34. The axial section 196 of the fluid input passage 190 includes an enlarged terminal outer end portion 204, which terminates at one of the recesses 52 formed interiorly of the outer end region of the spindle section 18. Forming an extension of the fluid passage section 196 is a tubular nozzle 206 (see also FIG. 6) received in an otherwise unoccupied one of the recesses 52. An inner end of the nozzle 206 is tightly received in the enlarged end portion 204 of the passage section 196 and an outer end of the nozzle is tightly received in a large bore section 208 defined by a fifth stepped bore provided in the reaction plate 96 (see FIG. 3). A small end of the fifth stepped bore defines a small fluid passage 210. The radial distance of the receptacle 208 and fluid passage 210 from the rotation axis of the drive shaft 30 is equal to that of each of the tubular mounting pins 74 about which the first stage planet gears 70 are mounted for rotation by the pair of roller bearings 72. Thus, cooling oil spraying from the fluid passage 210 will enter the tubular inner ends of each of the pins 74 as it rotates into alignment with the passage 210, the fluid once inside the pins 74 passing though the radial openings 78, approximately at mid-length locations of the pin, into the annular space 80 between the roller bearings 72 so as to cool and lubricate the bearings. Provided for creating a dam for containing fluid in each of the pins 74 until it passes through the openings 78 is a snap ring 212 located in a groove provided inside the pin 74 at a location spaced axially inward from the openings 78 (FIG. 2).

The tubular nozzle 206 bridges the zone containing the disc brake pack 150 and contains four axially spaced, radial openings 214 for distributing cooling and lubrication fluid to the rotor and stator discs 152 and 154, respectively, it being noted that the openings 214 are directed upwardly so that the fluid will collide with the wall of the recess 52 and be evenly dispersed over the brake pack 150. It is here noted that the opposite surfaces of the stator plates 154 are smooth while those of the rotor plates 152 have braking material applied thereto in a checked pattern (refer to FIG. 11) thereby forming a plurality of grooves 216, 1 mm in depth, for example, providing paths through which cooling fluid may flow when the service brake is engaged, noting that at this point no fluid will flow out through the openings 161 provided in the reaction plate 96 since the stator disc 154 adjacent the reaction plate will then be tight against the reaction plate 96 preventing such flow. Any fluid which flows through the brake pack 150 toward the drive shaft 30 will drain through a plurality of holes 218 provided in the cylindrical inner section 50 of the first stage planet carrier 42. From there, the fluid can pass inwardly and onto inner surfaces of the annular park brake and service brake pistons 116 and 138, respectively, with flow occurring between adjacent ends of the pistons when either or both are actuated, this flow entering an annular groove 220 which is connected to a bearing lubrication fluid passage 222 having an outlet adjacent the inner wheel bearing 20 and in communication with an annular space 224 extending between the inner and outer wheel bearings 20 and 22, with lubrication oil flowing into the space 224 acting to lubricate both bearings. Fluid passing through the inner wheel bearing 20 serves to lubricate the face seal assembly 28 and fluid which flows through the outer wheel bearing 22 provides some lubrication for the planetary transmission 44.

Cooling fluid is drained from the final drive and brake assembly 10 by three outlet passages 226 provided in the spindle flange 16 and leading to the annular cavity containing the face seal assembly 28.

Having described the preferred embodiment, it will become apparent that various modifications can be made without departing from the scope of the invention as defined in the accompanying claims.

The invention claimed is:

1. In a vehicle final drive including a fixed spindle having an annular mounting flange joined to an axially outwardly projecting cylindrical portion, a wheel hub mounted for rotation about said spindle cylindrical portion by axially inner and outer wheel bearings, said hub containing a planetary transmission located outboard of said spindle and including a ring gear having a hub splined to an exterior of an outer end region of said spindle cylindrical portion and serving as a support for an inner race of said axially outer wheel bearing, a brake assembly located within said spindle and including a disc brake pack comprising interleaved rotor and stator discs located in an axially outer region of said spindle cylindrical portion, and an annular reaction plate being mounted to an axially outer end face of said cylindrical portion of said spindle, the improvement comprising: said planetary transmission being a two-stage planetary transmission having a first stage planet carrier located within said ring gear and carrying a plurality of equal angularly spaced support pins; a set of first stage planet gear bearings being located on each support pin; a first stage planet gear being rotatably mounted on each support pin by said set of planet gear bearings; each said first stage planet gear having teeth meshed with teeth of said ring gear thereby supporting said first stage planet carrier; said first stage planet carrier including a cylindrical portion projecting axially inwardly through said annular reaction plate and through said disc brake pack and having a splined connection with said rotor discs; at least one recess extending axially within said cylindrical portion of the spindle adjacent said disc brake pack; a cooling and lubrication fluid supply passage being provided in said spindle in axial alignment with, and having an end opening into, said at least one recess; said reaction plate being provided with a fluid-directing bore aligned axially with said fluid supply passage; and a tubular fluid distribution nozzle having opposite ends respectively received in said fluid supply passage and said fluid-directing bore, with a plurality of radially extending, fluid distributing holes being axially spaced along said nozzle for supplying cooling and lubrication fluid to said disc brake pack while fluid also flows out the end of the nozzle and through said fluid-directing bore.

2. The vehicle final drive, as defined in claim 1, wherein said fluid-directing bore is a stepped bore having a larger end receiving said nozzle and having a smaller end sized for causing fluid to be squirted towards said first stage planet carrier; and each of said support pins carried by said first stage planet carrier being tubular and provided with fluid feed passages providing fluid communication between an interior of each pin and the set of bearings rotatably mounting a respective first stage planet gear to the pin, and each pin located for passing in axial alignment with said stepped bore as the first stage carrier rotates, whereby fluid squirting from said smaller end of said stepped bore passes into each pin and from there to the set of bearings located at the exterior of the pin.

3. In a vehicle final drive including a fixed spindle having an annular mounting flange joined to an axially outwardly projecting cylindrical portion, a wheel hub mounted for rotation about said spindle cylindrical portion by axially inner and outer wheel bearings, said hub containing a planetary transmission located outboard of said spindle and including a ring gear having a hub splined to an exterior of an outer end region of said spindle cylindrical portion and serving as a support for an inner race of said outer wheel bearing, a drive shaft extending axially in said spindle and hub and being coupled to said planetary transmission, a brake assembly located within said spindle and including a disc brake pack comprising interleaved rotor and stator discs located in an axially outer region of said spindle cylindrical portion, and an annular reaction plate being mounted to an axially outer end face of said cylindrical portion of said spindle, the improvement comprising: an input quill including an outer annular mounting portion tightly received in an inner end region of said spindle and being joined to a tubular hub disposed concentrically about said drive shaft; an input thrust bearing rotatably supporting said drive shaft within said hub; said planetary transmission being a two-stage planetary transmission and including a first stage planet carrier surrounding said drive shaft; and a shaft support bearing rotatably supporting an outer end of said drive shaft from said first stage planet carrier.

4. The vehicle final drive, as defined in claim 3, wherein said input quill is provided with a cooling and lubrication fluid feed passage extending between an outer surface of said mounting portion and a location inside said hub and in fluid communication with said thrust bearing; and a cooling and lubrication fluid supply passage being provided in said spindle and coupled to said fluid feed passage for providing fluid for cooling and lubrication said input thrust bearing.

5. The vehicle final drive, as defined in claim 4, wherein said mounting portion of said input quill is annular and is joined to an inner end of said hub by a radial end portion; and said feed passage extending through said end portion of said quill.

6. The vehicle final drive, as defined in claim 4, wherein said mounting portion of said input quill is annular and is disposed in concentric, spaced relationship to said hub; said input quill further including an inner end portion joining said mounting portion with said hub and cooperating with said mounting portion and hub to define an outwardly opening spring receptacle; and said brake assembly including a stack of Belleville springs having an inner end located within said receptacle, a piston bore defined within said spindle outwardly of said mounting portion of said input quill, and an annular park brake piston received for reciprocal movement within said piston bore and having an annular, inwardly facing surface engaging an outer end of said stack of Belleville springs.

7. The vehicle final drive, as defined in claim 6, wherein said piston bore is stepped with first and second bore sections having a first diameter and located on opposite sides of a third bore section having a diameter smaller than said first diameter; said park brake piston including annular, radially outer and inner sections respectively slidably received in said first and third sections of said piston bore, with said annular inwardly facing surface of said park brake piston extending between respective inner diameters of said a radially outer and inner sections and with an annular outwardly facing surface extending between outer diameters of said radially outer and inner sections of said park brake piston; said outer section of said park brake piston being located radially outwardly of said stack of Belleville springs and having an inner end surface disposed in confronting relationship to a outwardly facing end surface of said mounting portion of said input quill, with said end surfaces being so located relative to said stack of Belleville springs that compression of said stack of Belleville springs by pressure acting on said annular outwardly facing surface of said park brake piston is limited by said inwardly facing end surface of said piston engaging said outwardly facing end surface of said input quill before the stack of Belleville springs become completely compressed to form a solid stack, thereby extending the service life of the stack of Belleville springs.

8. The vehicle final drive, as defined in claim 6, wherein said piston bore is stepped with first and second bore sections having a first diameter and located on opposite sides of a third bore section having a diameter smaller than said first diameter; said park brake piston including annular, radially outer and inner sections respectively slidably received in said first and third sections of said piston bore, with said annular inwardly facing surface of said park brake piston extending between respective inner diameters of said a radially outer and inner sections and with an annular outwardly facing surface extending between outer diameters of said radially outer and inner sections of said park brake piston; said second section of said piston bore having an outer end located adjacent an axially inner end of said disc brake pack; an annular service brake piston respectively having radially outer and inner sections respectively mounted for axial movement within said first and third bore sections; said disc brake pack including an annular pressure plate engaged by an annular, axially outward facing end surface of said service brake piston; said park brake piston and said service brake piston respectively having outer and inner ends that are engaged with each other in the absence of any pressure fluid acting on the park and service brake pistons, whereby said disc brake pack is compressed by a preload force of said stack of Belleville springs acting through said park brake and service brake pistons, thereby establishing a park brake engaged condition.

9. The final drive transmission, as defined in claim 6, wherein said planetary transmission is a two-stage transmission having a first stage planet carrier located within said ring gear and carrying a plurality of equal angularly spaced first stage planet gears having teeth meshed with a first set of teeth of said ring gear; a first stage sun gear being mounted for rotation with an outer end of said drive shaft and having teeth meshed with teeth of said first stage planet gears; a second stage planet carrier forming an end plate releasably fixed to an outer face of said wheel hub, a plurality of equal angularly spaced second stage planet gears having teeth meshed with a second set of teeth of said ring gear and being mounted to said second stage planet carrier; a second stage sun gear having an inner end mounted to said first stage carrier for rotation with said first stage carrier and having an outer end supported for rotation in said second stage planet carrier; said sun gear having teeth meshed with said teeth of said second stage planet gears; said drive shaft and first and second stage carriers being so mounted that they may be withdrawn outwardly from said wheel hub upon said second stage planet carrier being released from said wheel hub; and said hub of said input quill having a threaded inner end region adapted for receiving a threaded tool after said drive shaft and first and second stage carriers are removed, the tool having an annular inwardly facing surface disposed for engaging an outer end of said stack of Belleville springs when said tool is advanced axially inwardly on said threads for causing said Belleville springs to be compressed between said end portion of said hub and said tool, to thereby relieve the preload force imposed on the park brake piston by the stack of Belleville springs, thereby permitting the disc brake pack to be serviced.

* * * * *